United States Patent [19]

Barnes et al.

[11] Patent Number: 4,958,680
[45] Date of Patent: Sep. 25, 1990

[54] APPARATUS FOR PARTICULATE SOLIDS REGENERATION

[75] Inventors: Peter H. Barnes, The Hague; Johannes L. Nooyen, Amsterdam, both of Netherlands

[73] Assignee: Shell Oil Company, Houston, Tex.

[21] Appl. No.: 213,750

[22] Filed: Jun. 30, 1988

[30] Foreign Application Priority Data

Jul. 9, 1987 [GB] United Kingdom ............... 8716160

[51] Int. Cl.⁵ ............... B01J 38/30; B01J 38/32
[52] U.S. Cl. ............... 165/104.18; 165/104.16; 422/144; 422/146; 502/44; 502/41
[58] Field of Search ............... 165/104.16, 104.18; 422/144, 146; 502/44, 41

[56] References Cited

U.S. PATENT DOCUMENTS

| | | | |
|---|---|---|---|
| 4,353,812 | 10/1982 | Lomas et al. | 165/104.16 |
| 4,374,750 | 2/1983 | Vickers et al. | 422/144 |
| 4,595,567 | 6/1986 | Hedrick | 165/104.14 |
| 4,757,039 | 7/1988 | Lomas | 502/44 |
| 4,786,622 | 11/1988 | Walters et al. | 502/44 |

FOREIGN PATENT DOCUMENTS 253770   3/1970   U.S.S.R. ............... 165/104.16

Primary Examiner—Albert W. Davis, Jr.
Attorney, Agent, or Firm—Ronald R. Reper

[57] ABSTRACT

An apparatus for particulate solids (e.g. FCC catalyst) regeneration comprising a regenerator housing containing fluidization means arranged below spent-solids inlet means and regenerated-solids outlet means and having fluid in- and outlet means, and further comprising at least one external heat exchanger housing containing heat exchanger means and communicating with the regenerator housing via solids in- and outlet means in which apparatus at least one solids outlet means directly connect a lower section of the heat exchanger housing(s) with a section of the regeneration housing above the fluidization means.

6 Claims, 2 Drawing Sheets

APPARATUS FOR PARTICULATE SOLIDS REGENERATION

BACKGROUND OF THE INVENTION

The invention relates to an apparatus for particulate solids regeneration which comprises a regenerator housing containing fluidization means arranged below spent solids inlet means and regenerated solids outlet means having fluid in- and outlet means, and further comprising at least one external heat exchanger housing containing heat exchanger means and communicating with the regenerator housing via solids in- and outlet means.

Such apparatus is known and has the advantage that relatively high rates for deposit (e.g. coke) burn-off for the spent solids can be attained in the regenerator without excessive temperature increases as a result of the cooling of the hot solids taking place in the heat exchanger housing. Therefore, such a known apparatus is particularly suited for continuously regenerating Fluid Catalytic Cracking (FCC) catalyst particles.

However, the known apparatus has as a disadvantage that the temperature inside the regenerator, in particular in the section thereof directly above the fluidization means where hot regenerated solids are withdrawn (through the regenerated solids outlet means), is in some cases difficult to control, in particular when a FCC regenerator is to be operated in complete CO combustion mode i.e. substantially completely converting carbon monoxide produced during coke burn-off into carbon dioxide with a relatively large combustion air/solids ratio.

Moreover, known apparatus generally comprise rather complicated riser systems and flow regulation means (including valves) to transport regenerated solids back from the heat exchanger to the regenerator.

Surprisingly, it has now been found that the aforementioned disadvantages can be overcome by an apparatus as described hereinbefore in which at least one solids outlet means directly connect the lower part of the heat exchanger housing(s) with a section of the regenerator housing above the fluidization means.

SUMMARY OF THE INVENTION

The invention therefore to an apparatus for particulate solids regeneration which comprises a regeneration housing containing fluidization means arranged below spent-solids inlet means and regenerated solids outlet means and having fluid inlet and outlet means, and further comprising at least one external heat exchanger housing containing heat exchanger means and communicating with the regenerator housing via solids inlet and outlet means in which apparatus at least one solids outlet means directly connect a lower section of the heat exchanger housing(s) with a section of the regenerator housing above the fluidization means.

DESCRIPTION OF PREFERRED EMBODIMENTS

Figure 1:
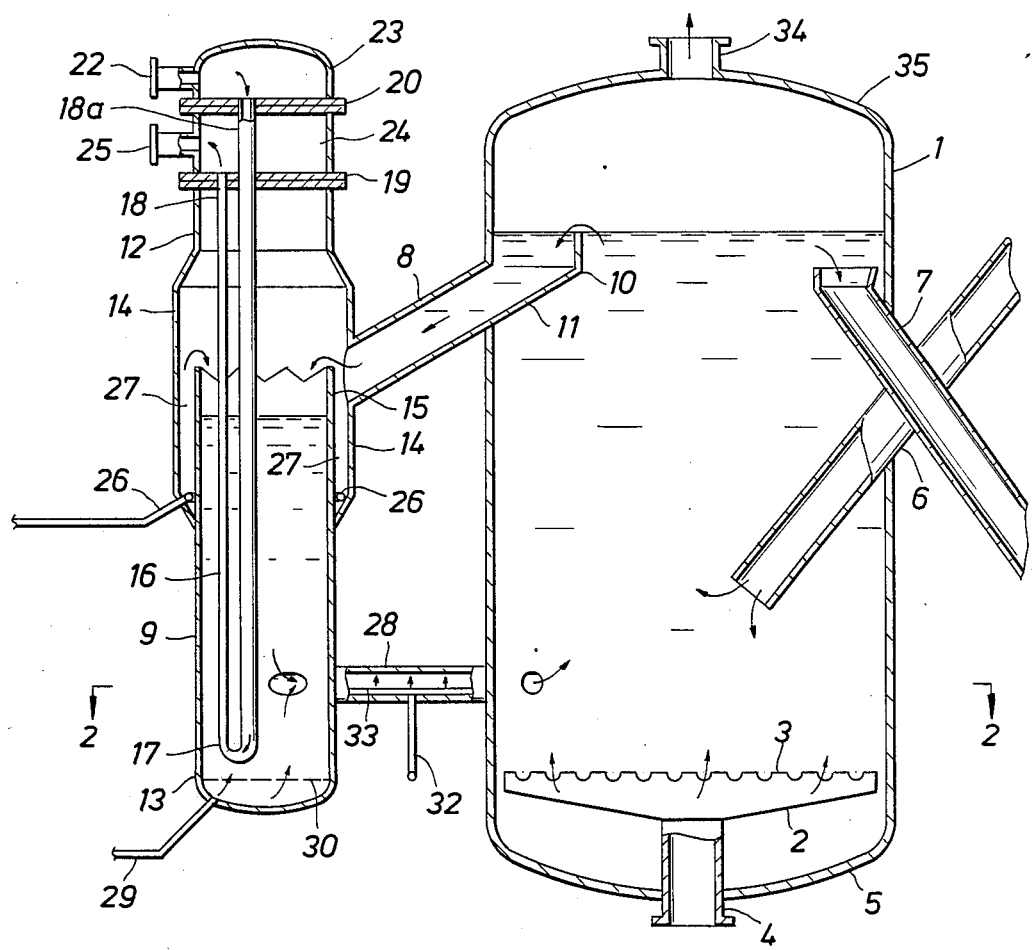
FIG. 1 relates to a longitudinal section of an apparatus according to the invention.

It should be noted that although the apparatus according to the invention will be described hereinafter only for its application in regenerating fluid catalytic cracking catalyst, said apparatus can also be suitably used in other applications such as the regeneration of absorbent particles or of catalyst particles for different processes.

The apparatus according to the invention will be elucidated with the use of the Figures in which different preferred embodiments have been incorporated without having the intent of limiting the invention to those particular embodiments as depicted in the Figures. Various elements are depicted in the Figures on a different scale for the sake of clarity. Reference numerals relating to corresponding parts are the same for FIGS. 1-4.

Figure 2:
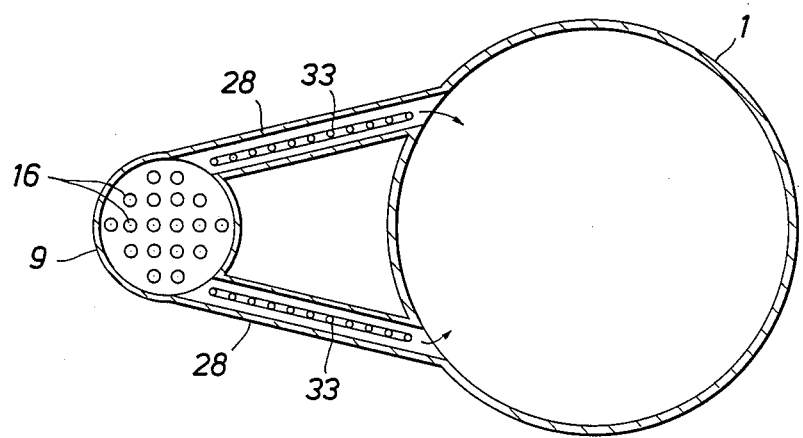
In FIG. 2 a cross-section is shown at AA' of the apparatus depicted in FIG. 1.

The apparatus depicted in FIGS. 1 and 2 comprises a regenerator housing (1) containing fluidization means (2) in the form of a fluid distribution grid (3) communicating with fluid inlet means (4) in the bottom section (5) of housing (1). During operation an oxygen-containing gas such as air, oxygen-enriched air (e.g. as obtained in a membrane separation process) or pure oxygen is introduced via fluid inlet means (4) into regenerator housing (1) in order to burn off coke which has been deposited on the catalyst particles during a (fluid) catalytic cracking operation carried out e.g. in a riser reactor (not shown in the Figures) and to fluidize the mass of catalyst particles present in housing (1). Spent catalyst particles (which do not have to be completely deactivated) containing e.g. from about 1-12% by weight of coke, based on the weight of the particles without cokes deposits, withdrawn from a catalytic cracking reactor enter the regenerator housing (1) during operation via spent solids inlet means (6) and regenerated catalyst particles are returned to the said reactor via regenerated solids outlets means (7).

Preferably, the regenerator is operable in a substantially complete CO combustion mode by e.g. employing an excess of oxygen with respect to the amount of carbon which is to be burned off from a given amount of spent catalyst particles, resulting in a relatively low carbon/regenerated catalyst ratio. The present apparatus is particularly suited for the above-mentioned substantially complete carbon monoxide combustion as a result of the effective distribution of spent catalyst in regenerator housing (1) via solids inlet means (6) arranged above fluidization means (2).

Flue gas thus obtained in a complete CO combustion operation generally contains only a very small amount of carbon monoxide (e.g. less than 0.2% by volume (v) and in particular less than 0.1%v). Consequently an external CO combustor (which requires fuel to operate) is no longer needed in that case.

Part of the hot catalyst particles (e.g. having a temperature 10 in the range from about 400°-900° C, and preferably from 500°-700° C) are removed during operation from the fluidized mass of catalyst particles in housing (1) and are introduced via solids inlet means (8) into an external heat exchanger having a housing (9). In some cases it can be advantageous to provide a catalyst bin (10) at the end part (11) of solids inlet means (8)

extending into regenerator housing (1) in order to ensure a constant inflow of catalyst particles into solids inlet means (8).

In a preferred embodiment of the apparatus according to the invention as depicted in FIG. 1 the heat exchanger housing comprises upper (12)- and lower (13) tubular sections connected by means of a middle section (14) having a larger average diameter than the upper and lower sections and communicating with thee solids inlet means (8), said middle section (14) preferably comprising solids distribution means such as an impingement wall (15) in order to prevent direct infringement of hot catalyst particles with the heat exchanger means which are arranged inside heat exchanger housing (9). Preferably, fluidization gas (e.g. air) is introduced via secondary fluidization gas inlet means (26) into the annular space (27) formed between wall (15) and middle section (14) distributing hot catalyst particles substantially equally over the cross section of the heat exchanger.

A wide variety of heat exchanger means can be employed in the heat exchanger housing (9) such as tubes, plates or heat pipes. In a preferred embodiment of the present apparatus the heat exchanger means comprise a plurality of tubes (16) with closed lower end parts (17) and open upper end parts (18; 18a) mounted in a tube sheet (19, 20); the tube sheet(s) is (are) arranged above solids inlet means (8). In view of the relative high catalyst temperatures lower tube sheet (19) is suitably protected by means of a radiation shield (not depicted in the Figures). The heat exchanger means (e.g. tubes) are preferably upwardly removable from the heat exchanger housing (9), thus avoiding considerable additional construction effort which would otherwise be required to allow sufficient height underneath the heat exchanger housing to pull heat exchanger means downwardly out. The heat exchanger is shown at a larger scale than the regenerator in order to provide more detailed information in the Figures.

A plurality (e.g. 10-500) of heat exchanger tubes (16) are suitably provided with boiler feed water (or steam) introduced via cooling fluid inlet means (22) arranged in the header section (23) of upper heat exchanger section (12). Accordingly, cooling fluid (water) flows downwardly through the tubes extruded into the mass of hot catalyst particles and is subsequently heated thereby and flows upwardly (usually in the form of vapor through tube (16) into header section (24) provided with cooling fluid (e.g. steam) outlet means (25). In this manner a natural circulation of cooling fluid through the tubes is attained which is highly advantageous in case a boiler feed water pump would fail; in some cases it is even possible to avoid the use of such pumps altogether with the above-described set-up.

In the apparatus according to the invention it is essential that at least one solids outlet means (28) (providing relatively cool catalyst e.g. at a temperature from 400°-600° C) directly connect the lower section (13) of the heat exchanger housing (9) with the bottom section (5) of the regenerator housing (1) above fluidization means (2) in order to avoid excessively high temperatures above fluidization means (2). Consequently, thermal deactivation of the solids (e.g. catalyst) to be regenerated can be kept to a minimum in the present apparatus; hot catalyst particles emanating from spent solids inlet means (6) are immediately cooled by relatively cool catalyst particles entering the regenerator via heat exchanger solids outlet means (28).

In a preferred embodiment of the apparatus according to the invention the heat exchanger housing comprises both flow-through and back-mixed sections with regard to the solids flow directions. The middle section (14) and part of the lower section (13) of the heat exchanger housing are located above the solids outlet means (28). This combination of flow regimes results in many cases in optimal heat exchange between the hot catalyst particles and cooling fluid and improved temperature regulation inside the heat exchanger housing and the regenerator housing.

In order to fluidize the catalyst particles present in the heat exchanger housing, the lower section thereof is preferably provided with primary fluidization gas (e.g. air) inlet means (29) and distribution means (30) (preferably in the form of an air grid which can be removed for maintenance/inspection purposes). The flow rate of fluidization gas introduced into the heat exchanger housing should be controlled in order to attain the desired level of heat exchange at the surface of the heat exchange tubes. Moreover, the mass flow of solids flowing during operation through the solids outlet means (28) can be controlled to a certain extent by varying said flow rate of fluidization gas. The fluidization gas is suitably discharged from heat exchanger housing (9) through outlet means (28) and/or solids inlet means (8), or through a separate fluid outlet means (which is not depicted in FIG. 1).

However, in order to attain optimal solids mass flow regulation, the solids outlet means (28) are preferably provided with inlet means (32) for fluid (e.g. air). In a particularly preferred embodiment of the apparatus according to the invention inlet means (32) are in communication with fluid distribution means (33) which provide fluid (e.g. "fluffing" air) for keeping the catalyst particles in solid outlet means (28) in a suspended or even fluidized state in order to avoid blocking of said outlet means (28) during operation.

Preferably, the same fluid (e.g. air) is used for inlet means (4), (26), (29) and (32) and supplied at an elevated pressure of e.g. 2-50 bar via a single compression means such as an air blower, if required provided with two or more stages in order to be able to supply fluid at different pressure levels.

The solids outlet means (28) for the heat exchanger housing is (are) preferably free of valves in order to be able to exclude hot wall tubing from the apparatus according to the invention which results in considerably less complicated construction of the tube connections between the heat exchanger and regenerator housings i.e. using everywhere cold wall tubing (e.g. tubing lined with refractory material) without the use of complicated and costly expansion bellows. Moreover, as a result of the relatively short and simple direct tubular connections between the heat exchanger housing (9) and the bottom section (5) of the regenerator housing above fluidization means (2) a smooth, relatively high catalyst recirculation rate can be attained with the apparatus according to the invention resulting in a relatively low catalyst inventory requirement (thus allowing quick catalyst changeover).

As depicted in FIG. 2, in the present apparatus one heat exchanger housing (9) is suitably connected to the regenerator housing preferably arranged substantially horizontally at least at their end parts connected to housing (1) in order to allow a smooth mass flow of catalyst particles to housing (1) which can be excellently regulated. Moreover, the use of at least two solids outlet tubes allows application of smaller diameter tubing than with the use of one solids outlet tube, thus improving the flexibility of said tubes, which can be important during start-up and shutdown of the apparatus according to the invention. Furthermore, by using substantially horizontal outlet tubes sharp intersection angles between the tubes and the substantially vertical walls of the housings are avoided, which is very convenient when insulated, "cold-wall" tubing is used.

When the apparatus according to the invention is applied for the regeneration of coke-containing spent (FCC) catalyst particles by burning off the coke with an oxygen-containing gas appreciable amounts of hot flue gas (e.g. having a temperature from 400-800° C, in particular from 500°-7.00° C are obtained from fluid outlet means (34) suitably arranged in the upper section (35) of regenerator housing (1). Said hot flue gas can be directed, preferably after separating off small solid particles, to a power recovery system (not depicted in the Figures) comprising a turbo-expander driving e.g. an electricity generator and/or an air blower supplying fluidization/combustion air to the regenerator.

Figure 3:
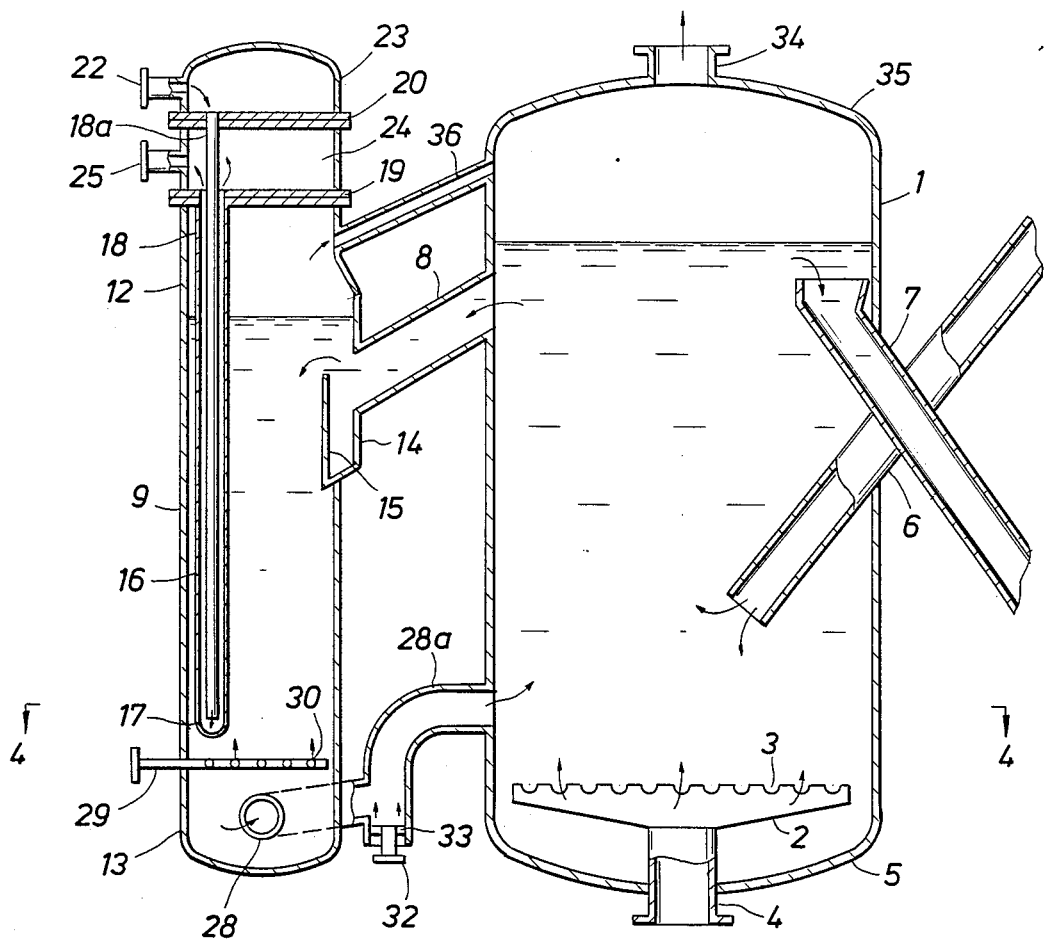
FIG. 3 represents a longitudinal section of an apparatus according to the invention which comprises two heat exchanger housings which are connected differently to the regenerator housing as compared with the apparatus shown in FIG. 1.
Figure 4:
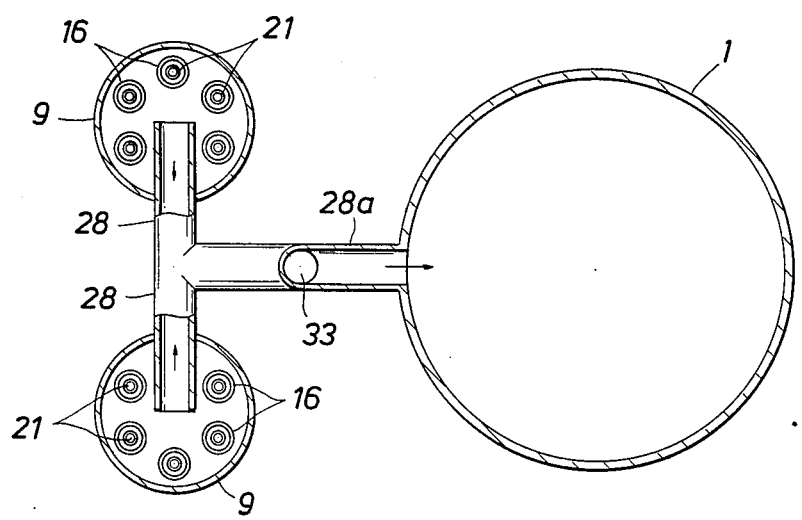
FIG. 4 relates to a cross-section at BB' of the apparatus depicted in FIG. 3.

In FIGS. 3 and 4 another preferred embodiment of the apparatus according to the invention is depicted of which only the differences with respect to the apparatus shown in FIGS. 1 and 2 are described.

The upper tubular section (12) of heat exchanger housing (9) is connected with the upper section (35) of the regenerator in the apparatus shown in FIG. 3 via tubular fluid discharge means (36) arranged above solids inlet means (8). Discharge means (36) allows the fluidization gas introduced via distribution nozzles (30) into housing (9) to be removed via regenerator section (35) with hot flue gas through outlet means (34), thus enabling the recovery of even more energy from the combined gas stream.

Middle section (14) of the heat exchanger housing (9) comprises an impingement plate as distribution means (15) in the embodiment shown in FIG. 3 in order to protect the cooling tubes (16) from direct impingement of hot catalyst particles entering via solids inlet means (8). Said tubes (16) are closed at their lower end parts and connected to lower tube sheet (19) at their upper end parts (18); tubes (16) are provided with inner open-ended tubes (21) which are mounted in upper tube sheet (20).

The apparatus depicted in FIGS. 3 and 4 comprises two heat exchanger housings (9) with similar internals as described herein before which are symmetrically arranged with respect to the central section (28a) of solids outlet means (28); section (28a) contains fluidization means (33) in its bottom end part which ensures excellent mass flow regulation.

What is claimed is:

1. Apparatus for particulate solids regeneration which comprises a substantially upright regenerator housing containing fluidization means arranged below spent-solids inlet means and regenerated-solids outlet means and having fluid in- and outlet means, and further comprising at least one external heat exchanger housing connected to the regenerator housing by means of at least two solids outlet tubes for flow of catalyst particles to said regenerator housing and containing heat exchanger means comprising a plurality of tubes with closed lower end parts and open upper end parts mounted in a tube sheet and in communication with the regenerator housing via solids inlet means and said two solids outlet means in which apparatus at least one solids outlet means directly connect a lower section of the heat exchanger housing with a section of the regenerator housing above the fluidization means.

2. Apparatus according to claim 1 wherein said at least two solids outlet means from the heat exchanger housing are free of any valves.

3. Apparatus according to claim 1 wherein said plurality of tubes with closed lower end parts are upwardly removable from the heat exchanger housing.

4. Apparatus according to claim 1 wherein said at least one heat exchanger housing comprises both flow-through and back-mixed-sections.

5. Apparatus according to claim 1 wherein said at least one heat exchanger housing comprises upper and lower tubular sections connected by means of a middle section having a larger average diameter than the upper and lower sections and communicating with the solids inlet means.

6. Apparatus according to claim 1 having in addition fluid discharge means extending from the heat exchanger housing above the solids inlet means to the upper part of the regenerator housing for permitting discharge of fluidization gas from said heat exchanger into said regenerator.

* * * * *